United States Patent [19]

Ulam

[11] 4,103,076
[45] * Jul. 25, 1978

[54] CLAD METAL PRODUCT OF Cu, Al AND STAINLESS STEEL

[75] Inventor: John B. Ulam, McMurray, Pa.

[73] Assignee: Clad Metals, Inc., Canonsburg, Pa.

[*] Notice: The portion of the term of this patent subsequent to Apr. 27, 1993, has been disclaimed.

[21] Appl. No.: 744,043

[22] Filed: Nov. 22, 1976

Related U.S. Application Data

[60] Continuation-in-part of Ser. No. 572,732, Apr. 29, 1975, Pat. No. 4,004,892, which is a division of Ser. No. 423,253, Dec. 10, 1973, Pat. No. 3,952,938.

[51] Int. Cl.² .............................................. B32B 15/20
[52] U.S. Cl. .................................... 428/653; 428/652
[58] Field of Search ................. 428/652, 653; 220/64, 220/63 R

[56] References Cited

U.S. PATENT DOCUMENTS

| | | | |
|---|---|---|---|
| 3,064,112 | 11/1962 | Hanzel | 428/652 |
| 3,112,185 | 11/1963 | Ochsner et al. | 428/653 |

Primary Examiner—Arthur J. Steiner
Attorney, Agent, or Firm—Buell, Blenko & Ziesenheim

[57] ABSTRACT

A new clad metal product is provided consisting of a core having at least one layer each of copper and of aluminum and at least one outer cladding layer of stainless steel on the layer of aluminum.

3 Claims, 1 Drawing Figure

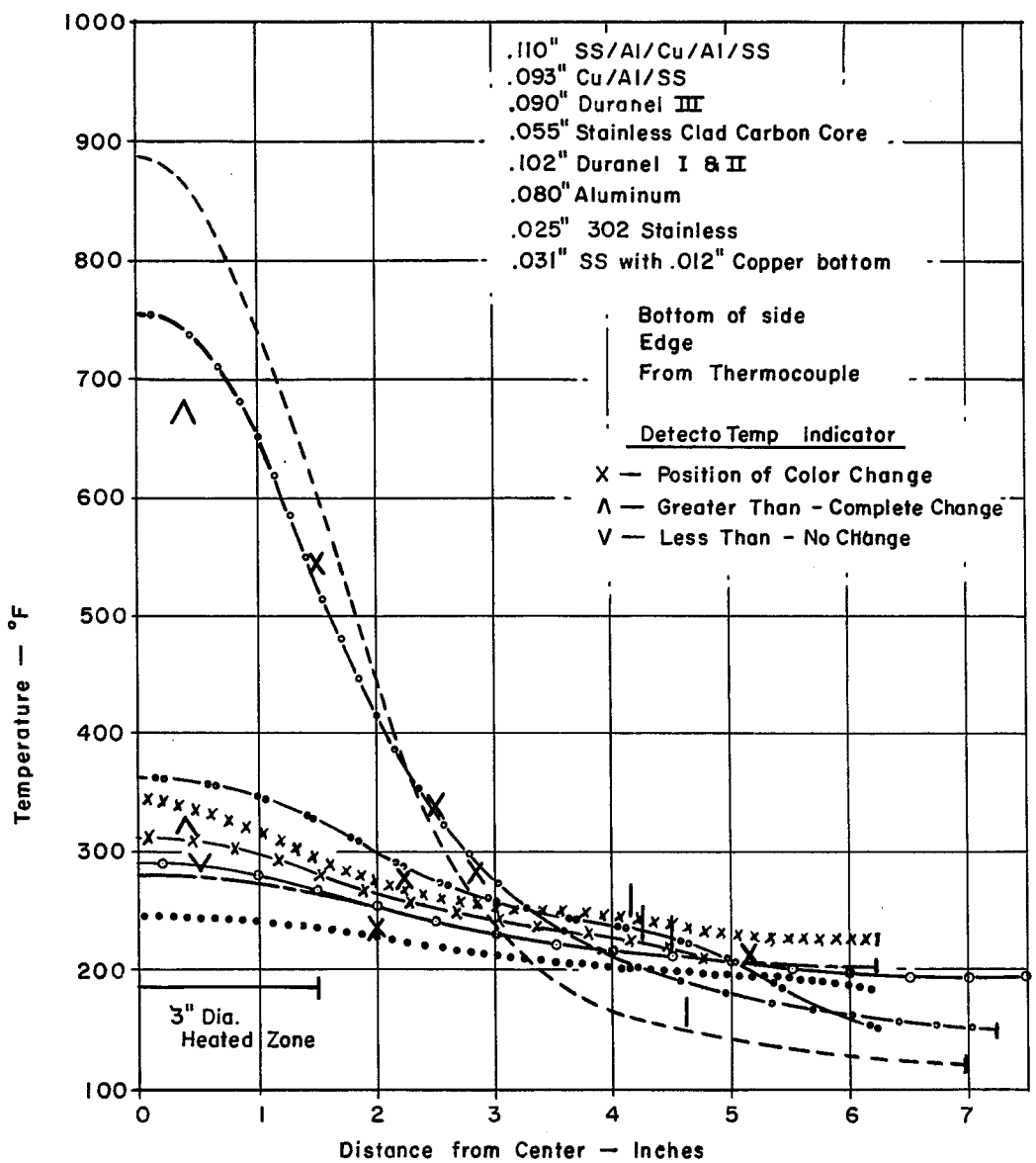

CLAD METAL PRODUCT OF Cu, Al AND STAINLESS STEEL

This application is a continuation-in-part of my copending application Ser. No. 572,732, filed Apr. 29, 1975, now U.S. Pat. No. 4,004,892 which was a division of my copending application Ser. No. 423,253, filed Dec. 10, 1973, now U.S. Pat. No. 3,952,938.

This invention relates to multiple member clad metal products and methods of making the same and particularly to a copper core aluminum and stainless steel clad product.

The use of laminated or clad metal products of three laminates or less is well recognized in the industry. For example, stainless steel utensils with a copper bottom layer are well known as are also aluminum cored stainless steels. These products have all been available for some time past and have been extensively used for production of cookware. One of the perennial problems with these prior art materials was and is an inability to get quick and even heat transfer over the entire pan area. These prior art materials are generally far superior to single layer metals but still far from perfect.

The present invention provides a new clad metal product based upon a copper clad aluminum core or a copper core between two layers of aluminum and clad with one or more layers of stainless steel. This new product overcomes the basic problems of the prior art materials discussed above. It will more rapidly and evenly distribute heat. It eliminates the problem of unsightly oxidation of copper in the prior art copper clad stainless steel utensils if used as a core. It provides for superior heat distribution as compared with prior art stainless steel clad aluminum. It combines all the unique thermal properties of copper and aluminum with the corrosion and abrasion resistance properties of stainless steel.

A unique and totally unexpected quality of the metal products of this invention and of cooking utensils made from the product of this invention are their property of reducing food adherence to the surface. All metal cooking utensils have been subject to the problem of sticking food stuffs to their surfaces when subject to heat. Teflon and other synthetic coatings have been applied to prevent this in the past. However, the material of this invention is substantially the equal of Teflon coated utensils in preventing sticking.

Tests to determine the various thermal characteristics of many metals used by the utensil trade were conducted to determine any differences that may exist in their capability of transferring heat evenly. The following test procedures were used to evaluate materials for use in utensils: A singular gas fired heat source similar to a Bunsen burner was placed at an equal distance under each utensil. The amount of gas available to the burner was constant. The flame impinged directly at the center of the outside bottom of the utensil causing a 3 inch circular contact. Thermocouples were attached on the inside center of the pan extending to the outside rim at one-half inch increments, including up the side wall. All utensils were of a similar shape; i.e., 10 inch fry pan. The results of the temperatures at the point of impingement are shown in the accompanying FIGURE, which graphically illustrates this.

Note should be made of the excellent heat transfer characteristics of the solid aluminum; copper/aluminum clad stainless; stainless clad aluminum/copper core products, and stainless clad aluminum 2-ply product. Since copper is considered the ultimate in thermal conductivity and is generally considered to be 100%, its ability to transfer heat is well known. Aluminum in its pure state is generally considered to rank second in heat transfer and possesses about 57% that of copper. Cast iron also used for cookware has approximately 16.6% the thermal conductivity of copper whereas carbon steel such as used in the core of stainless clad carbon steel as manufactured by my U.S. Pat. Nos. 2,718,690 and 2,758,368 contains 15.1% of the conductivity of pure copper. Further, stainless steel Type 304 (18% chrome, 8% nickel) has approximately 3.83% the thermal conductivity of pure copper. Ceramic materials similar to glass are total resistors of thermal transfer and have conductivities of approximately 1% that of pure copper.

A direct computation of the percentages of each metal used in the cross section of a clad metal potentially usable for cookware combined with the percentage of thermal conductivity in relation to copper would give one the heat transfer values necessary to determine the thermal conductivity of the as bonded clad metal. The thickness or mass of the metals used in the body of a utensil is also important when considering cooking performance, therefore, we recommend a minimum thickness of 0.050 inch (1.2 mm.) be used for said application.

Tests were conducted to determine food release characteristics of various materials. Similar sized utensils were placed on top of a gas or electrically heated range containing a center thermocouple capable of touching the exact center of the outside bottom of the utensil. The inside of the utensil was prepared by coating lightly with cooking oil. Flour was then sprinkled on the utensil surface covered with the cooking oil. Excess amounts of flour were removed by gravity throw-off. The resultant thin coating of flour on the surface of the utensil was then observed for color. The utensil was placed on the burner possessing the thermostat and heat was applied by adjusting the burner setting to 350° F. The utensils were subjected to heat for a time element of 2½ minutes, then were removed from the burner. An attempt to remote the heated flour from the surface of the utensil was made by placing said utensil under a faucet of water at a pressure of 35 lbs. Water temperature of approximately 110° F. was used for rinsing. Time of removal of the flour by the described rinsing process was recorded. The stick resistance was concluded as a direct relation with time of removal of same by said water rinse. The color of the flour is affected by heat concentration. The greater the heat concentration the darker burnt appearance of the flour. Utensil metals with high conductivity produced little or no heat tint on the flour surface. The results, corrected to uniform base of 0.125 thickness, are listed below:

| Product | Color Appearance of Flour | Removal Time | |
|---|---|---|---|
| 1. Cu/Al/SS (.125 thick) | Cream | 22 | secs. |
| 2. Teflon Coated Al (.125 thick) | Cream | 23 | secs. |
| 3. Al (.125 thick) | Cream | 25 | secs. |
| 4. SS Clad Al (.125 thick) | Cream | 29 | secs. |
| 5. SS/Al/Cu/Al/SS (.110 thick) | Cream | 33 | secs. |
| 6. SS/Al/SS (.110 thick) | Tan | 37 | secs. |
| 7. SS Al Bottom (.035 SS/.090 Al) | Tan-Brown | 48 | secs. |

-continued

| Product | Color Appearance of Flour | Removal Time |
|---|---|---|
| 8. Porcelain coated steel (.085 thick) | Tan-Brown | 39.4 secs. |
| 9. SS Carbon Steel (Iron Core) (.056 thick) | Dark Brown | 63.0 secs. |
| 10. High temperature glass | Dark Brown | 105 secs. |

The food release characteristics of stainless-/aluminum/copper utensils were vastly superior to all other metal and glass surfaces. Release characteristics of synthetic surfaces improve with thickness and were equal when 0.125 inch aluminum thickness was used. Utensils of equal thickness made from copper-/aluminum/stainless possessed release characteristics superior to Teflon coated aluminum of equal thickness and utensils of stainless, aluminum copper, aluminum stainless were in the same range as Teflon coated aluminum. The outstanding thermal properties of the clad metals resulting from the practices taught by this invention are herein described. This characteristic is most important to the establishment of the superiority of the metal combinations herein produced by this invention.

In this specification the word "sheet" or "sheets" is synonymous with coil or sheet coil as used by the metals industry.

In this invention, I provide an aluminum clad copper in which the aluminum may be clad on one or both sides of the copper. Said copper clad aluminum or copper cored aluminum may then be clad with stainless steel on one or both sides of the aluminum. The aluminum used can be substantially pure aluminum, such as Type 1100, 3003, 3004, or an aluminum alloy. I preferably use an aluminum such as Type 1145 coated as a layer clad on one or both sides of aluminum such as Types 1100, 3003, 3004. All members of the composite are preferably cleaned and conditioned on their surfaces by abrasive grinding to remove all oxides, however, this can be eliminated for the stainless steel but must be used on the aluminum. Preferably the product may be made by forming a pre-composite of aluminum and copper, whether the pre-bond be copper clad one side of aluminum or aluminum on both sides of a copper core, and thereafter bonding a stainless steel cladding to one or both sides of the aluminum. This pre-formed cladding or core is prefereably cleaned and conditioned on the aluminum surface or surfaces by abrading or wire brushing or any suitable mechanical method to remove all oxides, however, this can be eliminated for the stainless steel. In this practice the aluminum clad copper, or aluminum clad copper core has been cleaned as described above, cold bonded under pressure, e.g., by heavy reduction in the level of 40 – 80% in one or multiple passes on a rolling mill, then post heat treated if desired to increase the strength of the union between same. The pre-formed cladding or core consisting of aluminum and copper is heated along with the stainless steel to a temperature of about 300° – 800° F., reduced 20 – 70% in one pass or alternately reduced up to 5% in one roll stand followed by a reduction of 10 – 25% in a second roll stand, and then reheated to about 600° – 800° F., preferably at 700° F. to permit diffusion to occur between the adjacent layers of metals. This diffusion operation causes an increase in the bond strength between the three dissimilar metals, and also causes a certain amount of stress relieving. The resulting product is readily deep drawn into cooking vessels.

As a second alternative, the product may be made by forming a pre-composite cladding or core of aluminum and copper and thereafter applying the stainless steel cladding to one or both sides of the aluminum surface. In this practice, the aluminum and copper sheets are abrasively cleaned and conditioned, brought together into contact, heated to 300°–700° F. and subjected to 30 – 70% reduction. The aluminum and copper composite pre-form may be post heated to increase the strength of the union there between. The resulting copper-/aluminum compact is then abrasively cleaned on its aluminum surface or surfaces and is used as a cladding or core for a stainless cladding operation. In this step the assembly of cladding or core and stainless steel is again heated to about 300° – 800° F., subjected preferably to a first reduction of about 2 – 5%, and then subjected to a second reduction in the range of 5 – 25%, alternatively the assembly may be reduced in a single reduction pass of about 20 – 70%. The product is then heat treated to about 700° F. to cause annealing and diffusion as discussed above.

In a third alternative, one or two sheets of aluminum are mechanically cleaned, heated to 300° – 800° F. and brought into contact with one or both surfaces of sheet of copper which is at room temperature, and reduced by either the one or two step reductions discussed above. The pre-form composite of aluminum and copper may be heat treated if desired to increase the strength of the union between same. This cladding or core is then placed between sheets of stainless steel, reduced and annealed following the practices set forth above.

A fourth alternative would include the manufacture of the pre-form aluminum clad on one or both sides of the copper by cold or hot bonding, as discussed in the first alternative, and then the cold bonding of said pre-form of aluminum and copper on one or both sides with stainless steel by use of a heavy reduction step at the level of 30 – 70% in one or two passes. The resulting composite of stainless, copper and aluminum is heat treated as discussed in alternative No. 1.

In a fifth alternative, all members, i.e., copper, aluminum and stainless steel, of the composite are preferably cleaned and conditioned on their exposed surfaces by abrasive grinding to remove all oxides, however, this can be eliminated for the stainless steel. The pieces are heated separately or are brought together prior to heating, heated to a temperature of about 300° – 800° F., reduced 20 – 70% in one pass or alternately reduced up to about 5% in one roll stand followed by a reduction of 10 – 25% in a second roll stand and then reheated to about 600° – 800° F. (preferably at 700° F.) to permit diffusion to occur between the adjacent layers of metal. The diffusion operation causes an increase in bond strength between the three dissimilar metals.

This invention can, perhaps, be best understood by reference to the following examples of products and processes according to this invention.

EXAMPLE I

A sheet of copper having a thickness of 0.010 inch was abrasively cleaned with a wire brush and placed between two sheets of Type 1100 Aluminum each 0.075 inch thick, which were similarly abrasively cleaned. The copper and the aluminum are reduced approximately 50 – 65% to bond same together. The 0.050 inch thick pre-form of aluminum clad copper was abrasively cleaned on the aluminum surface, then brought into contact with two sheets of Type 304 stainless steel 0.010 inch thick, and placed with the stainless steel against the cleaned aluminum surfaces. The assembly of metals was heated to 700° F. and passed through a rolling mill to reduce the thickness to 0.065 inch, then passed through a second rolling mill and reduced to a thickness of 0.050 inches. The resulting product was then reheated to 700° F. for a sufficient time to produce diffusion between the adjacent metal layers in their entire interfaces. The final annealed product was deep drawn into cooking vessels such as 3 quart sauce pans and frypans.

Where it is desired to have one surface of stainless steel and the other of copper, the pre-foam consists of a copper clad aluminum material the same procedures as outlined above are followed.

EXAMPLE II

A sheet of 0.010 inch copper was abrasively cleaned and placed between two abrasively cleaned sheets of 0.125 inch Type Alclad 3003 Aluminum. The metals were heated to 450° F. and given a first rolling pass at about 2% reduction, and then rolled to about 0.110 inch thickness in a final pass. The rolled product was then reheated to 700° F. to permit diffusion between the metal layers to occur. The final product was cut into blanks and deep drawn into five quart Dutch ovens.

Where it is desired to have one surface of stainless steel and the other of aluminum or copper, the sme procedures outlined above are followed.

EXAMPLE III

A sheet of copper having a thickness of 0.010 inch was abrasively cleaned with a wire brush and placed between two sheets of Type 1100 Aluminum each 0.075 inch thick, and similarly abrasively cleaned. Two sheets of Type 304 stainless steel, 0.010 inch thick was abrasively cleaned, was placed on each side of the aluminum sheets. The assembly was heated to 700° F. and passed through a rolling mill to reduce the thickness to 0.120 inch. The resulting product was then reheated to 700° F. for a sufficient time to produce diffusion between adjacent metal layers at their interfaces. The final annealed product was deep drawn into cooking vessels such as three quart sauce pans and frypans.

I have found that the product of this invention can be utilized in the cooking vessel field in a variety of ways and combinations. For example, a five-ply material consisting of a copper core clad on each side with aluminum which is in turn coated on both sides with stainless steel can be used to form cooking vessels which have the desirable characteristics of stainless steel on the exposed surfaces but have a uniformity of heat transfer unattainable in any prior art materials.

A four-ply material having a copper core coated on each side with aluminum and having one outer layer of stainless is very satisfactory for making cooking vessel which are to be porcelainized or coated after forming on the exposed aluminum surface or used as discs attached to the bottom of utensils made conventionally from solid or clad metal. Here again the high heat transfer effects are achieved.

Finally, a three-ply material can be made using the procedures outlined above having a copper layer coated on one side with an aluminum core and having a layer of stainless steel bonded to the aluminum surface providing a product which may be formed into cooking utensils having a copper exterior surface for decorative and heat transfer purposes, and the other exterior surface of stainless steel with a core of aluminum.

I have discussed the composition of this invention in this application primarily in terms of cookware because this is the area where the largest amounts of such metals are used, however, the composition of this application can be used in any of a great variety of industrial uses where heat transfer is of importance and where resistance to discoloration, oxidation, etc., are desired.

In the foregoing specification I have set out certain preferred embodiments and practices of my invention, however, it will be understood that this invention may be otherwise embodied with the scope of the following claims.

I claim:

1. A clad metal product consisting essentially of a core having a member from the group consisting of copper and copper alloys and at least one layer of a member from the group consisting of aluminum and aluminum alloys, said core forming a major thickness portion of said composite and at least one outer cladding layer of stainless steel bonded to said aluminum opposite the copper and copper alloy group member, said product having been made by the steps of mechanically cleaning the contact surfaces of at least the copper and aluminum alloys, joining said sheets under pressure sufficient to reduce the total thickness of said sheets an amount between about 20% to 70% and stress relieving the joined sheets at a temperature in the range about 600° F. to 800° F. to cause diffusion between the sheets.

2. A clad product as claimed in claim 1 having a layer of aluminum on each side of the copper and one outer cladding layer of stainless steel on one of said aluminum layers.

3. A clad metal product as claimed in claim 2 in which the core is made up of a layer of copper with layers of aluminum on each side and the core is clad on each side by a layer of stainless steel.

UNITED STATES PATENT AND TRADEMARK OFFICE
CERTIFICATE OF CORRECTION

PATENT NO. : 4,103,076
DATED : July 25, 1978
INVENTOR(S) : John B. Ulam

It is certified that error appears in the above-identified patent and that said Letters Patent are hereby corrected as shown below:

Column 5, line 16, "pre-foam" should be --pre-form--.

Column 5, line 31, "sme" should be --same--.

Signed and Sealed this

Third Day of April 1979

[SEAL]

Attest:

RUTH C. MASON
*Attesting Officer*

DONALD W. BANNER
*Commissioner of Patents and Trademarks*